United States Patent [19]

Gustin et al.

[11] Patent Number: 5,196,620
[45] Date of Patent: Mar. 23, 1993

[54] FIXATION AND UTILIZATION OF ASH RESIDUE FROM THE INCINERATION OF MUNICIPAL SOLID WASTE

[75] Inventors: Frederick H. Gustin; Hugh P. Shannonhouse; Robert W. Styron, all of Marietta, Ga.

[73] Assignee: Municipal Services Corporation, Kennesaw, Ga.

[21] Appl. No.: 714,578

[22] Filed: Jun. 13, 1991

[51] Int. Cl.$^5$ .............................................. C04B 18/30
[52] U.S. Cl. .................................. 588/257; 588/252; 106/705; 405/128; 428/2; 428/404; 428/903.3
[58] Field of Search ................ 106/705, 802; 405/128, 405/129, 266; 264/131; 428/2, 404, 405, 903.3; 588/252, 257

[56] References Cited

U.S. PATENT DOCUMENTS

| | | | |
|---|---|---|---|
| 3,841,102 | 10/1974 | Cinner et al. | |
| 3,864,443 | 2/1975 | Hopkins | 264/131 X |
| 3,991,005 | 11/1976 | Wallace | 428/2 X |
| 4,120,735 | 10/1978 | Smith | |
| 4,234,632 | 11/1980 | Lubowitz | 428/2 |
| 4,377,414 | 3/1983 | Buschmann et al. | 106/705 |
| 4,471,916 | 9/1984 | Donaldson | |
| 4,475,951 | 10/1984 | Davis | |
| 4,600,514 | 7/1986 | Conner | 588/252 |
| 4,629,509 | 12/1986 | O'Hara et al. | |
| 4,657,561 | 4/1987 | Itoh et al. | 106/705 X |
| 4,687,373 | 8/1987 | Falk et al. | 588/252 X |
| 4,737,356 | 4/1988 | O'Hara et al. | |
| 4,741,782 | 5/1988 | Styron | |
| 4,744,829 | 5/1988 | Eirich et al. | 106/705 |
| 4,804,147 | 2/1989 | Hooper | |
| 4,940,611 | 7/1990 | Burnet et al. | 428/903.3 X |
| 4,997,572 | 3/1991 | Wurtz | |

OTHER PUBLICATIONS

U. S. Congress, Office of Technology Assessment, "Facing America's Trash: Whats Next for Municipal Solid Waste", OTA-O-424 (Oct./1989) Chapter. VI Incineration.

*Primary Examiner*—Randolph A. Reese
*Assistant Examiner*—Arlen L. Olsen
*Attorney, Agent, or Firm*—Biebel & French

[57] ABSTRACT

Municipal solid waste ash is utilized in the manufacture of an aggregate and is processed to form a cold bonded pellet which, when tested by means of TCLP leaching extraction tests using TCLP No. 2 extraction fluid, does not exceed the 1990 limits for the RCRA priority heavy metals. The pellets may be surface coated with defined agents to seal the pellet or to provide properties which enhance the use of the pellet in either asphaltic or cement concrete mixes. A method of utilizing MSW ash includes the steps of collecting the bottom ash and fly ash components, processing the bottom ash component to remove unprocessible material and crushing the crushable component to a desired size, magnetically separating the magnetic material from at least the processed bottom ash component, treating at least the fly ash component of the ash with alkali silicate to fix the heavy metals, and utilizing the processed ash such as by adding cement or other binders in a mix to form pellets having an early strength sufficient to permit handling after 24 hours. Pellets may be treated with selective components and coatings to enhance the pellet's use as an aggregate in asphaltic or cement concrete mixes.

26 Claims, 1 Drawing Sheet

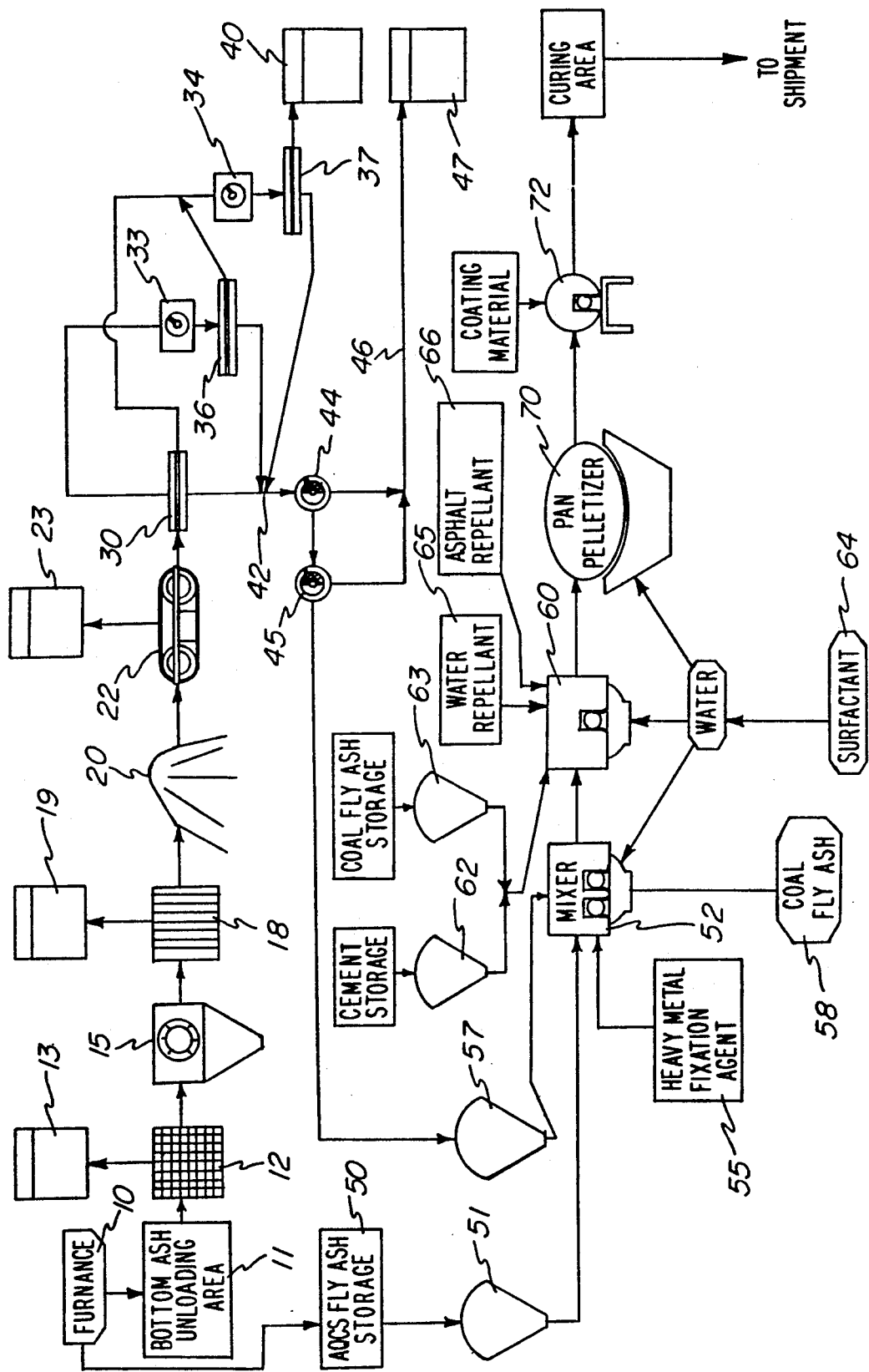

FIXATION AND UTILIZATION OF ASH RESIDUE FROM THE INCINERATION OF MUNICIPAL SOLID WASTE

BACKGROUND OF THE INVENTION

This invention relates to methods and products in the utilization and conversion of ash resulting from the incineration of municipal solid wastes, in the form of aggregates useful in asphaltic and portland cement concrete mixes which meet 1990 Federal drinking water standards as defined by the U.S. Environmental Protection Agency.

Municipal solid waste handling and disposal has received substantial attention by agencies of the United States Government as well as by interested environmental groups. For the purpose of this application, municipal solid waste (MSW) is defined as the gross product which is collected and processed by municipalities and governments.

MSW includes durable and non-durable goods, containers and packaging, food and yard wastes, and miscellaneous inorganic wastes from residential, commercial and industrial sources. Examples include newsprint, appliances, clothing, scrap food, containers and packaging, disposable diapers, plastics of all sort including disposable tableware and foamed packaging materials, rubber and wood products, potting soil, yard trimmings and consumer electronics, as part of an open-ended list of disposable or throw-away products. The broad spectrum of MSW content is described in "Characterization of Municipal Solid Waste in the United States: 1990 Update", United States Environmental Protection Agency (EPA), Publication EPA/530-SW-90-042 dated June 1990.

A substantial portion of the total available MSW is being reduced by fire incineration either by mass burn or through combustion of refuse-derived fuel (RDF). While incineration remains controversial, it continues to find increasing acceptance due to a number of factors which include the greatly decreased amount of residual material which must be landfilled, and to improved operating procedures which emit lower concentrations of pollutants into the atmosphere. The use of incineration is increasing and as of 1990, over 160 incinerators were combusting about 10-15% of the MSW generated in this country.

The by-product of MSW incineration is ash, called "MSW ash". The ash represents about one-fourth of the mass of material prior to incineration. Generally, two types of incinerator systems are in use. The first type is called a mass burn system. These are large facilities, usually having a capacity of over 200 tons per day, which burn the unprocessed mixed MSW in a single combustion chamber, usually under conditions of excess air. A second system is one where the MSW is first processed by mechanical means to produce a more homogeneous fuel, It is known as refuse-derived fuel (RDF), which material is then combusted in a boiler, to form a residue in the form of ash.

Both major systems, as well as secondary or smaller systems known as modular systems, are capable of recovering energy from the burn, usually in the form of steam or electric energy, and produce ash as a solid waste by-product of combustion. The subject matter of this invention resides in the fixation and pelletization of products derived from MSW ash, which products meet 1990 Federal drinking water standards for toxins and hazardous materials, including heavy metals.

The term "ash" as used herein encompasses the gross residue from the incineration of MSW following an initial beneficiation to remove the gross or oversized, non-combustion or non-crushable objects. The gross ash content is classified as either "fly ash" or "bottom ash." Typically, the fly ash fraction amounts to from about 5-15% of the total ash and comprises lighter particles which are carried off the burning grate by the convection or turbulence, and condense or form in the flu gas system. Fly ash is removed by precipitators or collection bags in a baghouse. Fly ash can also include the superheater or economizer ash which collects on internal parts of the boiler system which are blown down or removed from time to time and combined with the fly ash fraction. The fly ash also frequently contains spent lime from an air quality control system (AQCS) in which a lime reagent is sprayed into the flue gases to neutralize sulfur dioxide and hydrochloric and hydrofluoric acids. The hot flue gases evaporate the water portion leaving a dry powder residue which is removed in a baghouse and combined with the fly ash. The AQCS fly ash may be combined with bottom ash, or maintained separately and stored in dry silos, depending on the particular plant operations.

"Bottom ash" is the coarse ash residue which accumulates on the grate. It usually falls directly into a water quench pit or tank from which it is removed to a storage area. When MSW is incinerated, a portion of the original material will be non-combustible and will emerge from the incineration process with the bottom ash. This residue contains such items as bottles, cans, rocks, metal, slag, and certain organic wastes, and for the purpose of this invention it is assumed that such gross material, as previously mentioned, is removed at a first classification, usually at the burn facility, for by-pass disposal, such as in landfill.

A consideration of the toxic and non-toxic residues in the ash requires an appreciation of the care which is taken, at the burn site, to segregate or to refuse delivery of unacceptable waste. For example, at the Hennepin County Waste-to-Energy Facility, Hennepin County, Minn., such items as explosives, pathological and biological wastes, radioactive material, incinerator residue, sewage and cesspool sludge, human and animal wastes, large motor vehicle parts, tires, farm machinery, transformers, trees, liquid wastes and other such wastes are refused entry, and thus do not form part of the MSW or its ash. Nevertheless, a broad spectrum of inorganic and organic compounds are necessarily subjected to incineration, and certain portions of these elements and compounds are found in the incinerator ash. While it may be possible for the ash to contain hazardous organic materials such as dioxins and furans, tests have shown that these are well below the levels considered harmful where the ash is collected from a facility which is properly operated to maintain a desired combustion temperature and combustion retention time.

Major inorganic components include aluminum, calcium, chlorine, iron, silicon, sodium and zinc as major components, along with carbon. The ash may also contain a broad range of trace metals, including the eight RCRA priority metals (As, Ba, Cd, Cr, Hg, PB, Se, Ag), as well s copper, cobalt, nickel and tin. In a typical facility, the major components may be identified in combined ash as shown in Table 1.

TABLE 1

| | |
|---|---|
| Silicon Dioxide | 40% or greater |
| Aluminum Oxide | 10-20% |
| Iron Oxide | 10-20% |
| Magnesium Oxide | 1-6% |
| Sodium Oxide | 1-6% |
| Potassium Oxide | 1-6% |
| Sulfate Ion | 1-6% |
| Chloride Ion | 1-6% |
| Phosphate Ion | 1-6% |

The ranges of the small or trace amounts of inorganic elements are represented by Table 2, in terms of pounds of material per ton of combined ash, representing a typical analysis.

TABLE 2

CONCENTRATIONS OF INORGANIC ELEMENTS IN COMBINED ASH FROM MUNICIPAL WASTE INCINERATORS

| Elements | Pounds/Ton of Ash |
|---|---|
| Arsenic | * to 0.10 |
| Barium | 0.16 to 5.40 |
| Cadmium | * to 0.20 |
| Chromium | 0.02 to 3.00 |
| Lead | 0.06 to 73.20 |
| Mercury | * to 0.04 |
| Selenium | * to 0.10 |
| Silver | * to 0.19 |
| Aluminum | 10.00 to 120.00 |
| Antimony | <0.24 to <0.52 |
| Beryllium | * to * |
| Boron | 0.05 to 0.35 |
| Calcium | 8.2 to 170.00 |
| Cobalt | * to 0.18 |
| Copper | 0.08 to 11.8 |
| Iron | 1.38 to 267.00 |
| Lithium | 0.01 to 0.074 |
| Magnesium | 1.40 to 32.00 |
| Manganese | 0.03 to 6.26 |
| Molybdenum | * to 0.58 |
| Nickel | 0.03 to 25.82 |
| Phosphorous | 0.58 to 10.00 |
| Potassium | 0.58 to 24.00 |
| Silicon | 2.76 to 392.14 |
| Sodium | 2.20 to 66.60 |
| Strontium | 0.02 to 1.28 |
| Tin | 0.03 to 0.76 |
| Titanium | 2.00 to 56.00 |
| Vanadium | 0.03 to 0.30 |
| Yttrium | * to 0.02 |
| Zinc | 0.18 to 92.00 |

(Excluding oxygen, sulfates and chlorine)
*Less than 1/100 of a pound

Many of the inorganic constituents, or contaminants, have unlikely sources. Cadmium comes from metal coatings and platings on "white goods" such as home appliances, rechargeable batteries, printing inks and color pigments. Lead may originate in rust-proofing paints, wire and cable insulation, bottle caps, and the contact bases of burned-out light bulbs. Mercury is found in disposable batteries, such as hearing aid batteries, power control switches, certain paints, and fluorescent lights. Plastic materials are also a major source of lead and cadmium. Nickel-cadmium batteries include both nickel and cadmium.

Conventionally, the fly ash is combined with the bottom ash at the burn facility for transport to landfill. Only a small portion of the ash has found acceptance for commercial utilization, and in such instances where the resultant product is exposed to humans, there has been lacking an assurance that the material has been processed to recognized or particular EPA standards.

If the fly ash and spent lime fraction are combined with the bottom ash for treatment or disposal, the combined ashes will have moisture content of about 15-20%. The fly ash plus spent lime fraction is itself dry but is hygroscopic in nature and will absorb a portion of the moisture present in the bottom ash, thus reducing the overall combined ash content, when combined. The bottom ash moisture content is substantially higher, averaging 20-30%, where the fly ash is handled and stored separately, such as in dry bins.

Prior attempts at utilization, which have involved processing or treatment for hazardous materials or components, have generally failed to take advantage of the fact that the ash fractions themselves have differing concentrations of certain metals and other possible contaminants, and since they are formed and collected at physically separated locations, the fly ash fraction and the bottom ash fraction may be treated separately by processes tailored to the particular component or group of components in the fraction to be brought within required specifications.

In particular, the Resource Conservation and Recovery Act (RCRA) and the regulatory agencies operating under the Act (Public Law 94-580 (1976)) as Amended and as defined in Title 40 of the Code of Federal Regulations (40 CPR 142), have established maximum safe limits for solid waste and for drinking water as set out below in milligrams per liter:

TABLE 3

| | Federal Drinking Water Limits as Mg/l | |
|---|---|---|
| RCRA Metals | Solid Waste Limits | 1990 Federal Drinking Water Standards |
| Arsenic | 5.0 | 0.05 |
| Barium | 100.0 | 1.00 |
| Cadmium | 1.0 | 0.01 |
| Chromium | 5.0 | 0.10 |
| Lead | 5.0 | 0.05 |
| Mercury | 0.2 | 0.002 |
| Selenium | 1.0 | 0.01 |
| Silver | 5.0 | 0.05 |

The drinking water standards for the eight RCRA priority metals set out above are 1/100th of that of the corresponding solid waste limits. Prior processes and techniques have not produced an economically useful product from MSW ash which meets federal drinking water standards when measured by the Toxicity Characteristic Leaching Procedure (TCLP) and as defined at 51 Fed Register 21648, Jun. 13, 1986 and in EPA Method 1311.

The TCLP leaching test has been found to be more aggressive than the extraction procedure toxicity test (EP-TOX) in the measurement of leaching potential, due to the lower pH (2.88) of the TCLP fluid #2. The repeatability of the results by different laboratories following the TCLP procedure makes it superior to the EP-TOX.

The TCLP procedure has now been adopted by the EPA as a replacement for the EP-TOX (EPA method 1310). The aggressiveness of the TCLP test requires that new approaches and methods for economic utilization of MSW ash be developed.

In order to make an economic use of a substantial part of the municipal solid waste ash produced at any given facility, it is necessary to process and convert the ash into a useable end product. If such product is used to add bulk to asphaltic or portland cement concrete mixes it may do so as an aggregate, but first must be converted to a suitable aggregate form, such as by pelletizing.

Therefore, in addition to the fixation or chemical treatment of targeted components or elements, the end product must also meet those physical standards which have been created and promulgated for aggregates. These standards relate not only to sieve analysis and specific gravity, but also relate to other required properties of the product including hardness and durability in relation to resistance to abrasion, soundness and resistance to sulfate, resistance to freezing and thawing, and absorptivity. Thus, even though a synthetic by-product of MSW ash may be rendered inert by processing to the levels of federal drinking water standards, nevertheless such product would have restricted or limited commercial use if it failed to conform to the physical standards for such products.

SUMMARY OF THE INVENTION

This invention is directed to the manufacture of an economically useful product from MSW ash. In the preferred form, the product consists of an aggregate which is composed primarily of processed MSW ash which has been rendered environmentally acceptable, and a suitable cementitious material and pozzolan.

The pelletized aggregate is a cold bonded portland cement product as finished or formed in a pan pelletizer. The rounded pellet is both strong and durable, and meets the physical and chemical requirements for such aggregates so as to be fully acceptable as an aggregate for use in portland cement concrete, and for use in asphaltic concrete. Unpelletized material may be used as a sand substitute, provided that it has undergone chemical fixation.

The method produces an aggregate pellet in which the leachable dioxins and furans are either non-existent or practically unmeasurable, in which the leachable RCRA priority metals are at or below specified federal drinking water standards, and in which the aggregate complies with mechanical and physical specifications. In a preferred procedure, the pellets are coated with one or more materials which provide specific properties useful for the mix intended. Thus, where the pellets are intended to be used in an asphalt mix, relatively low absorption as well as a desirable quick lime interface surface can be achieved by applying a light powder of $-200$ mesh calcium oxide and hydrating the same to cause it to swell and harden on the surface and in the microscopic cracks and pores for sealing the aggregate pellets. This substantially reduces the asphalt absorption into the aggregate pellets to a value of 2% or less. Where the pellets are intended to be used with portland cement concrete it is desirable to render the pellets hydrophobic by the incorporation in the pellet mix and/or on the pellet surface a suitable hydrophobic coating or material.

In the initial processing of the MSW ash, it is preferred to handle the bottom ash component separately from the fly ash component although it is within the scope of the invention to treat the bottom and fly ash components as combined. A facility for making aggregate pellets may be located in proximity to the incineration installation and in proximity, if possible, to a bypass disposal site. The bottom ash can be delivered to the facility in sealed bed, watertight, and covered dump trucks. For inventory control, the incoming trucks can be weighed upon arrival, and proceed to an unloading area. The bottom ash is then processed through a gross de-lumper for removing large oversized and unprocessable lumps and onto one or more scalping screens which also remove oversized non-crushable objects such as 1" or larger in size. From the scalping screen the initial processed bottom ash may be conveyed directly to a processing area, or if necessary, it can be placed in stockpile storage, such as in an ash storage hall using a radial stacker.

The relatively dry fly ash fraction, that is fly ash or fly ash combined with spent lime, can be conveyed to the facility in dry bulk pneumatic tanker trucks. On arrival, the trucks may be weighed and unloaded pneumatically into a dry storage silo. It is understood that state of the art emission controls should be used for handling the fly ash, such as to those standards and equipment presently used by the coal fly ash and cement industries.

In the processing of the fly ash, at least the bottom ash component is processed to reduce it to a maximum size as from $+4$ to $+8$ mesh, and to remove a substantial portion of the magnetic fraction in the form of iron and magnetic ferric oxides ($Fe_2O_3$). It is preferred that not more than 10% by weight of the final aggregate product should be iron expressed as ferrous oxide. The amount of iron present may be controlled by carefully removing, by magnetic separation, the magnetic iron fraction to the point where the remaining magnetic iron fraction is negligible, while the product is crushed and/or screened to a size where it may be readily blended and mixed, preferably not exceeding 4-mesh in size. Of course, some portion of the iron content can come into the mix as part of the portland cement or coal ash, and this should be recognized as a possible source of iron contamination.

Tests have shown that the RCRA priority metals are present in higher concentrations and leach more quickly from the fly ash fraction. The fly ash fraction may be treated by fixation separately from that of the bottom ash fraction, with the resultant substantial savings in the quantity of alkali silicates required for treatment, preferably potassium silicate. However, in order to provide assurance as to the environmental adequacy of such process, a procedure should be initiated whereby the metals fraction of the bottom ash is carefully monitored to assure that, at all times, it remains substantially free of such priority heavy metals as would require separate fixation or fixation combined with the fly ash.

If only the fly ash component is to receive chemical fixation, which is preferred, this fraction, in suitable proportion to the final mix, is added to a mixer, and a heavy metal fixation agent is added together with a required quantity of water to provide a desired consistency. The water component may approximate 80–100 lbs/ton of ash. After a short period of mixing and blending with the fixation agent to contact the particles to render inert the heavy metals (usually two to five minutes), the bottom ash fraction is added along with the remaining water to provide a fixed or constant moisture, which may be in the order of 15-25%, according to the mix. For proper utilization it is desired that the proportions of the processed bottom ash fines and treated AQCS fly ash be approximately in proportion to the generated quantities of each of these by-products by the burn facility. Unless otherwise identified, all percentages given herein are by weight.

The re-combined fly and bottom ash are fed through a pin mixer in which cementitious agents in the form of portland cement, lime, and/or coal fly ash are blended. At this point, other pozzolanic agents may be added such as silica fume. Further, where desired, a non-swelling clay in the form of kaolin may be added at a rate such as 1% of the mix. Also, water-reducing agents and hydrophilic materials may be added. A surfactant may be added to reduce water demands, and to help wet the fly ash, and the mixed material is then applied to a conventional pan pelletizer for pelletizing.

Thereafter, it is desirable to apply specific surface coatings corresponding to the desired characteristic of the cured pellet. Asphalt absorption in the pellets can be substantially reduced such as to 2% or less by applying a fine mesh quick lime coating to the green pellets, for example, by a drum mixer, so that the quick lime collects on the surface and penetrates the microscopic pores. Thereafter the coating is subjected to a fine water spray for hydrolyzing the calcium oxide, causing it to expand into the microscopic pores, effectively sealing the pellet. The excess calcium oxide resides on the surface and cooperates as an anti-stripping agent in an asphalt mix.

An alternative or supplemental procedure for reducing asphalt absorption is that of blending a glycol compound into the mixture prior to pelletizing. For example, ethylene glycol repels asphalt and therefore may be used as an inherent part of the mixture, with or without the lime coating heretofore described.

Where the pellet is to be used as a concrete aggregate, it may be desirable to coat the green pellet with a cement/clay blend to form a dense hard coating. At the same time, the surface may be coated with a hydrophobic powder, such as calcium stearate or a liquid mix sold by Master Builder Technologies of Cleveland, Ohio as Rheomix No. 235. Further, Mix 235 may be added at the rate of 1/10 to 1% per 100 pounds of portland cement used in the pozzolan prior to pan pelletizing.

Potassium silicate is preferred as a fixative agent for heavy metals, even though sodium silicate may be obtained at lower cost, since sodium reacts with sulfate in concrete mixes to form expansive compounds. However, in appropriate instances, sodium silicate may be used. A suitable and preferred potassium silicate fixative consists of Mix K-20 sold by Lopat Industries, Inc. of Wanamassa, N.J. 07712, and described in U.S. Pat. No. 4,687,373.

The product resulting from the process of this invention quickly air hardens and obtains substantial compressive strengths within twenty-four hours and within forty-eight hours. It is important that the product quickly obtain early compressive strength to permit immediate handling and early utilization, within two days of manufacture, if desired. Utilizing the process of this invention, 2-inch cubes have 24-hour compressive strengths of 1,800 psi or more and 48-hour compressive strengths of 3,000 psi or more. The addition of 1 to 5% calcium hydroxide, in the mix, also improves the one-day strength and further reduces asphalt absorption.

Where the products are coated, as described, absorption as determined by ASTM-D-2041 does not exceed 3.5% and preferably does not exceed 2.0%, calculated as asphalt absorption. The sulfate soundness does not exceed the requirements as tested by ASTM-C-88 and the loss by abrasion and impact does not exceed 40% when tested according to ASTM procedure C-535 in the Los Angeles abrasion and impact machine test. Additionally, the product is resistant to freezing and thawing as defined by ASTM-C-666 and by AASHTO designation T-103. The amount of clay lumps and friable particles does not exceed 2% and therefore meets the requirements of ASTM-C-142 and the friable requirements of ASTM-C-331.

In addition to the mechanical and physical requirements, the aggregate does not exceed 10% and preferably 8%, by weight, of iron expressed as ferric oxide ($Fe_2O_3$). Most importantly, when ground to minus 100 mesh and tested under the TCLP test procedure as defined above, and as outlined by the U.S. EPA in document SW-846. The aggregate meets the defined 1990 federal drinking water standards for the eight RCRA priority metals, and therefore substantially exceeds the requirements for aggregates in asphaltic and portland cement concrete mixes.

It is accordingly an important object of this invention to provide a pelletized asphaltic or portland cement concrete aggregate which meets the physical and mechanical requirements for such aggregates, having as its principal ingredient processed ash residue from the incineration of municipal solid wastes, in which the heavy metal components are converted to inert and essentially nonleachable metal silicates so as to meet current 1990 federal drinking water standards for RCRA priority metals as set forth above.

Another object and advantage of the invention is the provision of an aggregate and method for making the same in which a specific surface sealing coating is applied to enhance the use of the pellet in asphaltic or portland cement concrete mixes.

A further important object of the invention is the provision of a method of utilizing municipal solid waste ash in the manufacture of an acceptable synthetic aggregate, as outlined above.

A still further object of the invention resides in the provision of a synthetic pelletized aggregate or a cold bonded pellet and the method of making the same, in which the pellet is formed with a sealing coating on an outer surface.

These and other objects and advantages of the invention will be apparent from the following description, the accompanying drawings and the appended claims.

BRIEF DESCRIPTION OF ACCOMPANYING DRAWING

The figure of the drawing represents a diagrammatic flow chart showing the preferred practice of the method of the invention in the handling and treatment of municipal solid waste ash.

DESCRIPTION OF PREFERRED EMBODIMENTS

As described above, the AQCS fly ash fraction is received, at the treatment facility, preferably separate from and stored separately of the bottom ash fraction. Referring first to the bottom ash fraction which represents by mass and by weight, the substantial bulk of MSW ash, it is delivered from a furnace 10, which may be a mass burning furnace in the manner previously described, and unloaded in a holding area 11. At this point it may be picked up by suitable handling equipment, such as front end loaders, and applied to a first screen separation in the form of a grizzly screen 12. It is assumed at this point that the bottom ash in the holding area 11 has been grossly classified so as to remove therefrom the over-sized and non-burnable components or unburned components, which components may be bypassed to landfill, preferably prior to transporting the bottom ash to the aggregate processing facility.

The grizzly or Trommel rotary screen 12, such as for example manufactured by Amadas Industries of Suffolk, Va., may remove everything over 2.0 inches to an oversize bin 13, for bypass disposal, passing −2.0 inches to a mechanical delumper 15. In the delumper 15, the agglomerated ash lumps which can be broken down by impact are broken down, and the output is delivered to a second screen 18, which, for example, may separate the over 1.0-inch material to an oversize bin 19, and the 1.0-inch and under material may be passed to a storage mound 20 for further processing. It will therefore be seen that the initial processing from the unloading area 11 to the storage mound 20 has, for its purpose, the removal of the uncrushable objects in excess of 1.0 inch and the crushing and reduction of clinkers and ash conglomerates to a more usable state. At this time, it is desirable to begin a multiple stage iron particle and ferrous iron magnetic removal. Excessive iron component in the mix and in the end product, in time, oxidizes and expands, causing staining and physical disruption in portland cement concrete mixes.

The initial stage of magnetic removal is preferably by a magnetic belt separator 22 where the major portion of the magnetic iron, in quantity, including substantially all of the larger pieces, are removed from the stream and separated to a ferrous bin 23. At this point, the material passing the first ferrous magnetic separation may be applied to a three-deck screen 30 providing three separation fractions, the coarsest and intermediate fractions being approximately 1" and 3/8" and the final fraction being no coarser than from 4 to 8-mesh, preferably in the 8-mesh region.

The two cuts from such a three-deck screen 30 are applied respectively to crushers 33 and 34 for further reductions and to secondary screens 36 and 37 respectively. The oversize from screen 36 may be bypassed to crusher 34 while the oversize from screen 37 may be bypassed to a final ferrous and oversize bin 40. The materials passing through the respective screens 36 and 37 are joined with the materials passing the three-deck screen 30 and represent a processed bottom ash of reasonable uniform consistency as to size. The common output of the screens at the junction region 42 is typically as set out in Table 4.

vary, but the ash processing in accordance with this invention should reduce this component to approximately 8% or less of the mixture of the fly and bottom ash.

The AQCS fly ash, usually further including an excess of spent lime, is withdrawn from the fly ash storage area 50, which may be dry storage bins, by pneumatic conveyor to a surge hopper 51. Since the fly ash fraction may contain the higher concentration of the RCRA priority heavy metals, as previously identified, at least the fly ash fraction is then subject to treatment with a fixation agent in a paddle, pug-type, or other suitable mixer 52. As previously described, the chemical fixation process includes an agent which, preferably, includes a potassium silicate product 55 which is added to the AQCS fly ash fraction in the mixer 52, together with a necessary quantity of water such as to provide a moisture content of approximately 18%, for example.

As a further example, at this stage, the water component may approximate 80–100 lbs. per ton of fly ash during the fixation step, and the K-20 Agent 55 may be applied at the rate of one-half gallon per ton of fly ash. Heavy metal fixation is almost instantaneous with contact with the ash particles, and the charge of AQCS fly ash in the mixer 52 may be vigorously agitated from two to five minutes in order to assure complete fixation.

The mixer 52 may now be filled with the processed bottom ash collected from the magnetic separator drums 44 and 45 in a surge hopper 57, again with suitable additional water to maintain the desired moisture content. The ratio of processed bottom ash component to fly ash component may be on the order of from 3:1 to 5:1, the intent being to consume and utilize both the bottom and fly ash fractions in their entirety as they become available through the processing.

At this time, it may be desirable, optionally, to add further silicates to chemically fix the bottom ash. It may also be desireable to add a portion of the coal fly ash 58 as part of the mix and, if further desired, a quantity of silica fume (not shown), for mixing and blending and to provide final fixation of the heavy metals.

The mixed, blended, and stabilized combined ash product from the mixer 52 is then transferred to a pin mixer 60 for final processing and for the addition of the

TABLE 4

| | | Composite of Representative Mass-Burn Bottom Ash Moisture 19.5% ph - 10.5 | | | | | |
|---|---|---|---|---|---|---|---|
| Size | Net Wt. | % of Total | PerCent Retained | PerCent Passing | Non-Fe | Ferrous | % Fe |
| +1" | 435.5 | 5.5 | 5.5 | 100.0 | 340.9 | 100.6 | 22.8 |
| 1"-½" | 1,459.0 | 18.3 | 23.8 | 94.5 | 937.8 | 359.6 | 27.7 |
| ½"-No. 4 | 1,676.7 | 21.0 | 44.8 | 76.2 | 1,427.5 | 351.4 | 19.8 |
| No. 4-No. 16 | 1,437.8 | 18.0 | 62.8 | 55.2 | 1,090.2 | 369.2 | 25.3 |
| No. 16 | 2,964.7 | 37.2 | | | | | |

The screened and sized bottom ash is then applied to further processing by a pair of series-connected magnetic separator drums 44 and 45. The magnetic fraction is collected through a line 46 to a further ferrous storage bin 47. At this point, the processed bottom ash should not have more than 8% iron, most of which will probably be non-magnetic ferrous oxide, and is now in a condition in which it is ready for further processing with the fly ash fraction.

The decrease in iron oxide contents represents, typically, about a 60% decrease beginning from an average of approximately 20% Fe content, to 8% or less after processing, expressed as ferrous oxide. The incoming percentages of unburned ferric metals will, of course, major cementitious and pozzolanic components as well as additional water, again as required to maintain a constant moisture content. The pin mixer may be of the kind manufactured and sold by Ferro-Tech of Wyandotte, Mich. 48192 under the trade name Turbulator.

The pin mixer 60 is a high efficiency mixer and is the preferred place where the cementitious materials for the purpose of manufacturing pellets are added. Cementitious material includes portland cement 62 and preferably includes Class C coal fly ash 63. The coal fly ash may be either cementitious Class C or pozzolanic Class F as defined in ASTM-C-618. Class C is preferred, in which case substantially less portland cement can be used as compared to mixes where Class F fly ash is employed, but either may be used with an appropriate quantity of cement, recognizing that Class F fly ash is not hydraulic (self-setting). Where Class F fly ash is used, it may be desirable to add additional lime in the form of calcium hydroxide. As previously noted, 1-5% calcium hydroxide may also be used in the mix to increase the compressive strength and to reduce asphalt absorption.

As an example, the cement component may be from less than 10% to greater than 16% of the mix. Where the cement component is 16%, then Class C fly ash may constitute 22% by weight of the mix. Where 10% cement is used, then Class C fly ash may, typically, constitute about 35% of the mix.

Alternatively, and as another example, where Class F fly ash has been used, it has been found that 20% Type I portland cement and 5% lime provides good results. Again, the cementitious constituents may be varied within the scope of the invention such as to provide a quick setting capability with 48-hour strength, in 2-inch test cubes, of about 3,000 psi or more. In all of these mixes silica fume may be added, such as at a 1% rate.

At this point, a surfactant 64 may be added to reduce the amount of water required. A suitable surfactant may be Amphosol CG (Amphoteric) which is a coco amido betiane which is manufactured by Stepan Chemical Company, Northfield, Ill. 60093, and an anionic Triton GR-7M, a dioctyl sodium sulfosuccinate, manufactured by Union Carbide Company. A nonionic surfactant such as Tritan N-101, nonylpheonoxy polyethoxy ethanol, manufactured by Union Carbide Company, may be further added. These surfactants may be added at the rate of 0.0010% of the total mix. Also, at this point, a hydrophobic agent 65 to be added into the mix also where the product is to be used as an asphaltic aggregate, an asphalt repelling glycol agent 66 may be added such as ethylene glycol at the rate of 1 gal./ton of mix. This has been found to be effective in substantially reducing asphalt absorption since ethylene glycol repels asphalt.

Hydrophobic coatings may be applied by adding hydrophobic materials both to the mix and to the green pellets after pelletizing. One such hydrophobic material which repels water is calcium stearate which is in powder form, and may be added directly to the mix in the pin mixer. Another such hydrophobic agent which repels water is Rheomix No. 253 which is in liquid form, and may advantageously be added to the water fraction or component prior to adding the water to the mix. These hydrophobic agents facilitate reduced water absorption in portland cement concrete mixes.

The content of the mixer 60 is applied to a pan pelletizer 70 which may be a disc-type pelletizer as manufactured by Ferro-Tech, previously identified.

The output of the pelletizer 70 comprising green (uncured) pellets of from about ¼" to 158 " in diameter, and the green pellets may be cured as they are or they may be applied to a further mixer, such as the drum mixer 72, for coating.

Where the pellet is intended for use as an asphaltic aggregate, it is helpful to seal the microscopic pores in the pellet, which would otherwise increase asphaltic absorption, by coating the particles in the mixer 72 with a thin surface layer of −200 mesh quick lime, and thereafter spraying the pellets with a fine mist of water to hydrolyze at least a portion of the lime, causing it to expand and harden into the microscopic pores, thereby sealing the pellet. The lime is advantageously available as an anti-stripping agent to help the asphalt bond with the aggregate. This lime on the surface may eliminate the need for an anti-stripping agent in the asphaltic mix.

Other coatings may be applied to the green pellets, depending on ultimate use. For use in portland cement concrete mixes, it may be desirable to coat the pellets with a hard hydrophobic coating. A cement/clay blend may be added and hydrolyzed to form a dense hard coating. Also as previously identified, calcium stearate,. or Rheomix No. 253 may be added to provide a hydrophobic coating prior to curing and storing. Again, since calcium stearate is dry, it may be applied in dry form to the exterior surface and hydrolyzed while the liquid Rheomix material may be added by spraying.

In the selection of the cementitious and pozzolanic materials as described above, care must be taken to assure that unwanted RCRA priority metals are not inadvertently introduced in non-treated components, at either the mixer 52 or the mixer 60. Normally, coal fly ash, the by-product from burning pulverized coal in power plants, either Class C or Class F, is not a significant source of metals. However, it has been discovered that portland cement as delivered, may itself contain an excess of chromium, apparently due to the process of manufacture of the cement which, in the synthetic aggregate, may push the leachable chromium content above the standard and therefore should be closely monitored. It has been found that sulfate soundness has been maintained without the need for using Type II portland cement in the mix. It also should be recognized that some chromium content can find its way into the mix through the fly ash and silica fume which could cumulatively contribute to a higher leachable chromium element, but certain grades of Type I and Type II cement possible major contributor, and should be monitored as previously noted.

Also, in any utilization of the process of this invention in which the bottom ash is not treated with a fixative, the bottom ash should be monitored, preferably after processing and magnetic separation, at the hopper 57, for any leachable quantities of the RCRA priority metals as well as for any detectable dioxins or furans.

The following examples of mixes have produced good results:

| 100 Tons in Mix | |
|---|---|
| Mix No. 1 | |
| MSW ash | 61% |
| Type II cement | 16% |
| Class C fly ash | 22% |
| Silica fume | 1% |
| Lopat* (¼ gal. = 5#) | ¼ gal./ton of MSW ash |
| Water | 22% |
| Mix No. 2 | |
| MSW ash | 54% |
| Type I cement | 10% |
| Class C fly ash | 35% |
| Kaolin | 1% |
| Lopat | ¼ gal./ton of MSW ash |
| Water | 18% |
| Surfactant | 0.0010% |

*Lopat 0.0025% per lbs., tons, etc.

In the practice of this process, typically, a facility may produce about 260 tons of ash per day, 200 of which will be gross bottom ash, about 40 of which will be fly ash, and 20 of which will be spent lime combined with the fly ash. Of this, approximately 83% should be capable of processing into aggregate, approximately 12% recovered as ferrous metals, 1% recovered as non-ferrous metals, and approximately 4% sent to by-pass disposal. These percentages, however, will vary depending upon the quantity of oversize bottom ash which must be removed.

The chemical composition of the synthetic aggregate produced from combined MSW ash has been determined to be as follows in Table 5.

TABLE 5

TOTALS CONCENTRATIONS OF SYNTHETIC AGGREGATE PRODUCED FROM MSW COMBINED ASH

Procedure: ASTM, Part 05.05, Method D4326-84
ASTM, Part 05.05, Method 3683 for Lead, Zinc, and Copper Results: Results are reported in weight percent (Wt. %), on a dry basis. Elements are extrapolated to the oxide form to express results as required in ASTMC114. Chemically fixated metals are in fact in the silicate form, but not expressed as such in this Table.

| Parameter | Sample 1 | Sample 2 | Average |
|---|---|---|---|
| Silica, $SiO_2$ | 32.45 | 32.43 | 32.44 |
| Alumina, $Al_2O_3$ | 10.70 | 11.39 | 11.05 |
| Titania, $TiO_2$ | 0.82 | 0.80 | 0.81 |
| Ferric Oxide, $Fe_2O_3$ | 5.95 | 5.53 | 5.74 |
| Calcium Oxide, CaO | 29.02 | 29.76 | 29.39 |
| Magnesia, MgO | 2.38 | 2.40 | 2.39 |
| Potassium Oxide, $K_2O$ | 0.81 | 0.83 | 0.82 |
| Sodium Oxide, $Na_2O$ | 2.52 | 2.66 | 2.59 |
| Sulfur Trioxide, $SO_3$ | 2.54 | 2.56 | 2.55 |
| Phosphorus Pentoxide, $P_2O_5$ | 0.52 | 0.51 | 0.52 |
| Cupric Oxide, CuO | 0.11 | 0.07 | 0.09 |
| Lead Oxide, PbO | 0.16 | 0.09 | 0.13 |
| Zinc Oxide, ZnO | 0.25 | 0.24 | 0.25 |
| Loss on Ignition @ 750° C. | 9.74 | 9.67 | 9.71 |

In a typical example, the results of the totals of TCLP leaching before and after chemical fixation of a blend of top and bottom ash are set forth below in Table 6. In Table 6, the gross metallic amounts are first identified prior to fixation, and then the TCLP extraction fluid No. 2 leach results are provided following fixation in accordance with the process of this invention, both before and after fixation.

TABLE 6

MSW Ash Before Chemical Fixation

| Parameter | Total Comp (mg/kg) | TCLP Leach (mg/l) | Haz/Solid Waste Limits (mg/l) | 1990 Federal Drinking Water Standards (mg/l) |
|---|---|---|---|---|
| Arsenic | 44 | <0.002 | 5.0 | 0.05 |
| Barium | 435 | 3.0 | 100.0 | 1.00 |
| Cadmium | 38 | 0.11 | 1.0 | 0.01 |
| Chromium | 52 | 0.024 | 5.0 | 0.10 |
| Mercury | 6.5 | 0.006 | 0.2 | 0.002 |
| Lead | 1167 | 5.6 | 5.0 | 0.05 |
| Selenium | 0.65 | <0.005 | 1.0 | 0.01 |
| Silver | 10.07 | <0.01 | 5.0 | 0.05 |

Aggregate After Chemical Fixation (Aggregate Crushed to Minus 100 Mesh)

| Parameter | Total Comp (mg/kg) | TCLP Leach (mg/l) | Haz./Solid Waste (mg/l) | 1990 Federal Drinking Water Standards (mg/l) |
|---|---|---|---|---|
| Arsenic | 25 | <0.05 | 5.0 | 0.05 |
| Barium | 700 | 0.55 | 100.0 | 1.00 |
| Cadmium | 17 | 0.0002 | 1.0 | 0.01 |
| Chromium | 57 | 0.06 | 5.0 | 0.10 |
| Mercury | 4.3 | 0.0003 | 0.2 | 0.002 |
| Lead | 570 | 0.0002 | 5.0 | 0.05 |
| Selenium | <0.25 | <0.0005 | 1.0 | 0.01 |
| Silver | 7.6 | <0.01 | 5.0 | 0.05 |

In conclusion, it will be seen that this invention provides a method of making an economically useful commercial synthetic aggregate utilizing a substantial portion of MSW ash, which product is environmentally safe as defined by existing EPA standards. In some instances, it may be useful to withdraw the mixed and blended material from the pin mixer without pelletizing, for use as a "sand" filler for both asphaltic and portland cement concrete mixes. This material has the major properties and advantages of the pellets described above particularly including the leach ability standards, as set out in Table 6. The material from the pin mixer usually is reduced to a size of about 20 mesh and, accordingly, without further treatment is useful as a filler sand, as described.

While the method and product herein described constitute preferred embodiments of the invention, it is to be understood that the invention is not limited to this precise method and product, and that changes may be made therein without departing from the scope of the invention which is defined in the appended claims.

What is claimed is:

1. A cold bonded aggregate for a concrete mix in the form of a pellet comprising a body of processed ash residue from the incineration of municipal solid waste in which the heavy metal content of said ash residue has been fixed by an alkali metal fixative and said body is bonded by a cementitious binder, and having a hard sealing coating formed on the outer surface of the pellet body which is compatible with said concrete mix.

2. The aggregate of claim 1 in which the said mix is an asphaltic concrete and said coating comprises hydrolyzed powdered quick lime.

3. The aggregate of claim 2 in which said coating includes an excess of available quick lime forming an anti-stripping agent.

4. The aggregate of claim 1 in which said mix is a Portland cement concrete and said coating includes a hardened blend of cement and clay.

5. The aggregate of claim 1 in which said mix is a Portland cement mix and in which said coating is hydrophobic to reduce water absorption.

6. The aggregate of claim 1 in which said mix is an asphaltic concrete and said pellet body includes a glycol to reduce asphalt absorption.

7. The aggregate of claim 6 in which said glycol is ethylene glycol.

8. A cold bonded pellet-type aggregate for use with concrete mixes in which the pellets forming said aggregate comprise a cured mix of cementitious material and processed municipal solid waste ash having a maximum size of about number 4 mesh, said ash containing heavy metal components and including a bottom ash fraction and fly ash fraction in which at least said fly ash fraction is fixed with an alkali metal silicate fixative, and in which said pellet when ground to a minus 100 mesh and subjected to leaching tests using TCLP Fluid No. 2 according to Environmental Protection Agency Method No. 1311 as defined in Volume 51, Federal Register, page 21648 of Jun. 13, 1986 do not exceed the limits for each of the RCRA priority heavy metals as follows:

| Metal | Maximum Limits In Mg per Liter |
|---|---|
| As | .05 |
| Ba | 1.00 |
| Cd | 0.01 |
| Cr | 0.10 |
| Pb | 0.05 |
| Hg | 0.002 |
| Se | 0.01 |
| Ag | 0.05 |

9. The aggregate of claim 8 in which said pellets have a forty-eight hour compressive strength of about 3,000 psi.

10. The aggregate of claim 8 in which said bottom ash fraction does not exceed number 8 mesh in size.

11. The aggregate of claim 8 having no more than 10% by weight of ferrous oxide.

12. The aggregate of claim 8 in which said pellets have a sealing coating formed on the outer surfaces thereof.

13. The method of utilizing ash formed by the incineration of municipal solid wastes, in which said ash includes a bottom ash component and a fly ash component, into a useful and environmentally safe building component, comprising the steps of:
   collecting the bottom ash component and the fly ash component,
   processing the bottom ash component to remove gross non-processible materials, metals, and uncrushable objects in excess of ¼ in diameter,
   magnetically separating magnetic materials from said processed bottom ash component so that no more than about 10% by weight of said processed bottom ash component comprises ferrous metals,
   treating at least said fly ash component with an alkali silicate to fix the heavy metals in said fly ash component,
   blending said processed bottom ash component and said fly ash component,
   adding a cementitious binder to form a cementitious mix,
   pelletizing said mix to form individual pellets, and curing said pellets.

14. The method of claim 13 in which said treating step includes treating said bottom ash component with an alkali silicate solution to fix the heavy metals in said bottom ash component.

15. The method of claim 13 comprising the further step of adding a water repellant into said mix.

16. The method of claim 13 comprising the further step of coating the surface of said pellets with powdered quick lime and hydrolyzing said quick lime by spraying to form a sealing coating to said pellets.

17. The method of claim 13 further comprising the step of coating said pellets with a hard coating including portland cement and clay.

18. The method of claim 13 in which said mix is blended and mixed in a pin-type mixer.

19. The method of claim 13 comprising the step of adding from 1% to 5% by weight of calcium hydroxide to said mix to improve early compressive strength.

20. The method of claim 13 comprising the further step of adding ethylene glycol to said mix at a rate of about 1 gal./ton of mix.

21. The method of claim 13 comprising the further step of adding a surfactant to said mix.

22. The method of claim 21 in which said surfactant is coco amido betiane.

23. The method of claim 21 in which said surfactant is dicotyl sodium sulfosuccinate.

24. The method of claim 21 in which said surfactant is nonylpheonoxy polyethoxy ethanol.

25. A cold bonded aggregate for use with asphaltic concrete mixes in the form of a pellet in which said pellet comprises a body having processed ash residue from the incineration of municipal solid waste and a cementitious binder, and having a sealing coating on the outer surface of said pellet formed of hydrolyzed powdered quick lime.

26. A cold bonded aggregate for use with Portland cement concrete mixes in the form of a pellet in which said pellet comprises a body having processed ash residue from the incineration of municipal solid waste and a cementitious binder, and having a hard coating on the outer surface of said pellet formed of a hardened blend of cement and clay.

* * * * *